US011720292B1

(12) United States Patent
Bapat et al.

(10) Patent No.: US 11,720,292 B1
(45) Date of Patent: Aug. 8, 2023

(54) CAUSING A NETWORK STORAGE DEVICE HAVING DUAL STORAGE CONTROLLERS TO USE A NEW ISCSI QUALIFIED NAME

(71) Applicant: Lenovo Global Technology (United States) Inc., Morrisville, NC (US)

(72) Inventors: Vinay Bapat, Bangalore (IN); Mohammed Arakkal Kunju Yasser, Bangaluru (IN); Hari Om Sharma, Bangalore (IN)

(73) Assignee: LENOVO GLOBAL TECHNOLOGY (UNITED STATES) INC., Morrisville, NC (US)

( * ) Notice: Subject to any disclaimer, the term of this patent is extended or adjusted under 35 U.S.C. 154(b) by 0 days.

(21) Appl. No.: 17/706,662

(22) Filed: Mar. 29, 2022

(51) Int. Cl.
*G06F 3/06* (2006.01)

(52) U.S. Cl.
CPC .......... *G06F 3/0664* (2013.01); *G06F 3/0604* (2013.01); *G06F 3/067* (2013.01); *G06F 3/0632* (2013.01); *G06F 3/0659* (2013.01); *G06F 3/0683* (2013.01)

(58) Field of Classification Search
None
See application file for complete search history.

(56) References Cited

U.S. PATENT DOCUMENTS

| 2011/0191485 A1* | 8/2011 | Umbehocker | ...... H04L 63/0428 709/229 |
| 2022/0027051 A1* | 1/2022 | Kant | ..................... G06F 3/0605 |

OTHER PUBLICATIONS

"Open-E DSSV7 Active-Active vs. Active-Passive", (c)2012 Open-E, Inc. p. 1-9.*

* cited by examiner

*Primary Examiner* — Brian R Peugh
(74) *Attorney, Agent, or Firm* — Jeffrey L. Streets; Streets Lawfirm, PC

(57) ABSTRACT

A computer program product and corresponding computer-implemented method cause the performance of various operations to upgrade a network storage device having first and second storage controllers operating in an active-passive mode and disk media shared by the storage controllers. The first storage controller operating as a passive storage controller is caused to enter a new IQN for each virtual disk into a first iSCSI target configuration file and maintain a corresponding old IQN. The first storage controller is then caused to begin operating as the active storage controller so that the second storage controller, while operating as the passive storage controller, is caused to enter the new IQN for each virtual disk into a second iSCSI target configuration file and maintain the corresponding old IQN. Accordingly, the first and second iSCSI target configuration files map both the old and new IQNs to the virtual disks.

20 Claims, 7 Drawing Sheets

CAUSING A NETWORK STORAGE DEVICE HAVING DUAL STORAGE CONTROLLERS TO USE A NEW ISCSI QUALIFIED NAME

BACKGROUND

The present disclosure relates to management of the iSCSI qualified names (IQN) that are used to uniquely identify an iSCSI node according to the Internet Small Computer Systems Interface (iSCSI) protocol.

Background of the Related Art

In computing, iSCSI is an acronym for Internet Small Computer Systems Interface, an Internet Protocol (IP)-based storage networking protocol for linking data storage facilities. iSCSI provides block-level access to storage devices by carrying SCSI commands over a TCP/IP network. The iSCSI standard facilitates data transfers over intranets and to manage storage over long distances. It can be used to transmit data over local area networks (LANs), wide area networks (WANs), or the Internet and can enable location-independent data storage and retrieval.

The iSCSI protocol allows clients (called initiators) to send SCSI command descriptor blocks (CDBs) to storage devices (targets) on remote servers. iSCSI is a storage area network (SAN) protocol, allowing storage to be consolidated into storage arrays while providing clients (such as database and web servers) with the illusion of locally attached SCSI disks. iSCSI mainly competes with Fibre Channel, but unlike traditional Fibre Channel which usually requires dedicated cabling, iSCSI can be run over long distances using existing network infrastructure.

In essence, iSCSI allows two hosts to negotiate and then exchange SCSI commands using Internet Protocol (IP) networks. By doing this, iSCSI takes a popular high-performance local storage bus and emulates it over a wide range of networks, creating a storage area network (SAN). Unlike some SAN protocols, iSCSI requires no dedicated cabling and can instead be run over existing IP infrastructure. Although iSCSI can communicate with arbitrary types of SCSI devices, system administrators often use iSCSI to allow servers (such as database servers) to access disk volumes on storage arrays.

The main addressable and discoverable entity in a system implementing the Internet Small Computer Systems Interface (iSCSI) standard is referred to as an iSCSI node. An iSCSI node can be either an iSCSI initiator, an iSCSI target, or both. An iSCSI target can be a dedicated physical device in a network or a software-configured logical device on a networked server. There are different tools available to configure software iSCSI targets, such as SCSI target (SCST) and scsi-target-utils. Furthermore, iSCSI allows iSCSI initiators to send command descriptor blocks (CBDs) to an iSCSI target.

Both iSCSI targets and iSCSI initiators require unique names for the purpose of identification and handshake. An iSCSI qualified name (IQN) is the identifier used to uniquely identify an iSCSI node. The IQN format provides a unique naming scheme that allows organizational level control. The IQN format takes the form:
  iqn.yyyy-mm.naming-authority:unique name
where:
(1) "iqn" identifies the string as an IQN
(2) yyyy-mm is the year and month when the naming authority was established.
(3) naming-authority is usually reverse syntax of the Internet domain name of the naming authority.
(4) unique name is any name you want to use, for example, the name of your host. The naming authority must make sure that any names assigned following the colon are unique.

An iSCSI initiator may be implemented with an iSCSI host bus adapter (HBA). A typical HBA is a hardware device combining an Ethernet network interface controller, some kind of TCP/IP offload engine (TOE) technology and a SCSI bus adapter. The operating system sees the iSCSI HBA as a SCSI bus adapter.

An iSCSI target storage device may expose a target IQN that may be used by an iSCSI initiator for various purposes, such as Virtual Machine (VM) disks, host operating system disks, or Storage Area Network (SAN) boot.

BRIEF SUMMARY

Some embodiments provide a computer program product comprising a non-transitory computer readable medium and program instructions embodied therein, the program instructions being configured to be executable by a processor to cause the processor to perform various operations. The operations may comprise identifying a network storage device having first and second storage controllers operating in an active-passive mode and disk media shared by the first and second storage controllers. The operations may further comprise causing the first storage controller operating as a passive storage controller to enter, for each of a plurality of virtual disks on the disk media, a new IQN for the virtual disk into a first iSCSI target configuration file and maintain an old IQN for the virtual disk in the first iSCSI target configuration file, wherein the first iSCSI target configuration file maps both the old and new IQNs to the virtual disks for the first storage controller. Still further, after an operation causing the first storage controller to begin operating as the active storage controller and the second storage controller to begin operating as the passive storage controller, the operations may further comprise causing the second storage controller operating as the passive storage controller to enter, for each of the plurality of virtual disks on the disk media, the new IQN for the virtual disk into a second iSCSI target configuration file and maintain the old IQN for the virtual disk in the second iSCSI target configuration file, wherein the second iSCSI target configuration file maps both the old and new IQNs to the virtual disks for the second storage controller.

Some embodiments provide a computer-implemented method comprising identifying a network storage device having first and second storage controllers operating in an active-passive mode and disk media shared by the first and second storage controllers. The computer-implemented method may further comprise causing the first storage controller operating as a passive storage controller to enter, for each of a plurality of virtual disks on the disk media, a new IQN for the virtual disk into a first iSCSI target configuration file and maintain an old IQN for the virtual disk in the first iSCSI target configuration file, wherein the first iSCSI target configuration file maps both the old and new IQNs to the virtual disks for the first storage controller. Still further, after the computer-implemented method causes the first storage controller to begin operating as the active storage controller and the second storage controller to begin operating as the passive storage controller, the computer-implemented method may further comprise causing the second storage controller operating as the passive storage controller to enter, for each of the plurality of virtual disks on the disk media, the new IQN for the virtual disk into a second iSCSI target configuration file and maintain the old IQN for the virtual disk in the second iSCSI target configuration file, wherein the second iSCSI target configuration file maps both the old and new IQNs to the virtual disks for the second storage controller.

DETAILED DESCRIPTION

Figure 1:
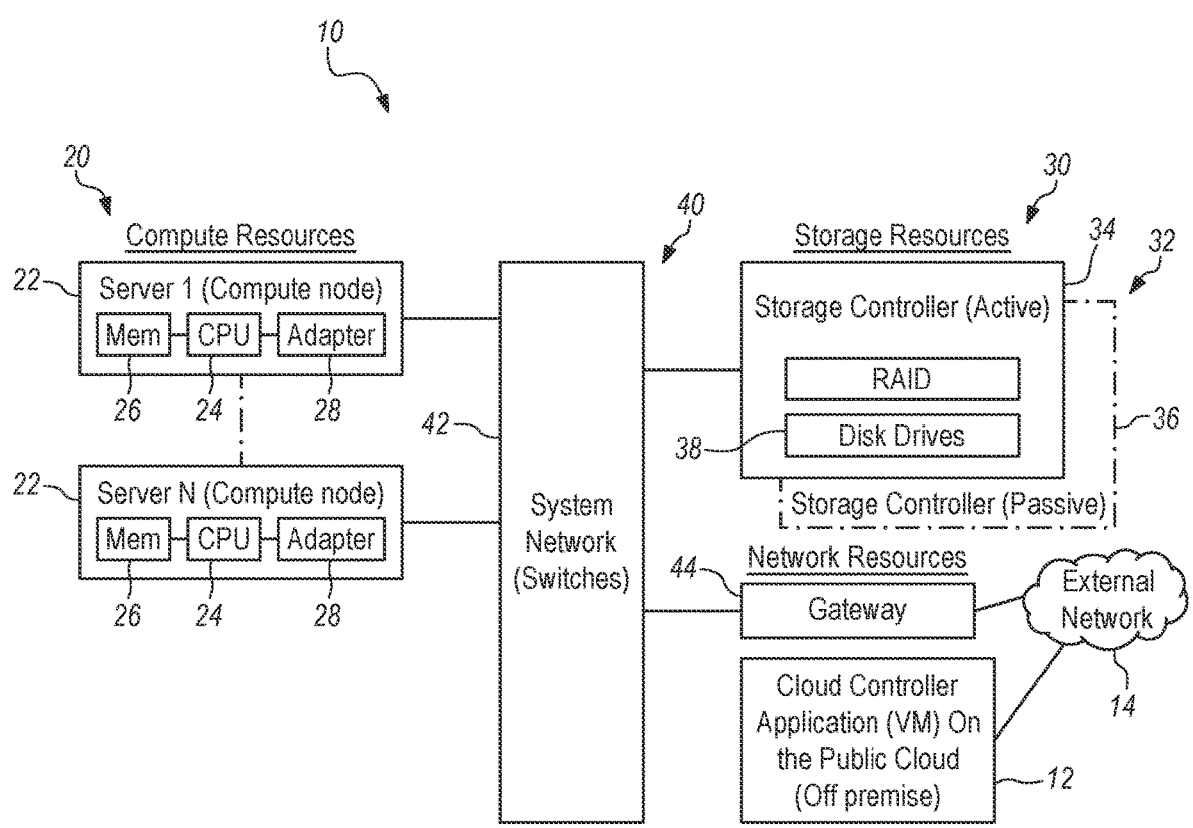
FIG. 1 is a diagram of a composable computing system in communication with a cloud controller application.

Some embodiments provide a computer program product comprising a non-transitory computer readable medium and program instructions embodied therein, the program instructions being configured to be executable by a processor to cause the processor to perform various operations. The operations may comprise identifying a network storage device having first and second storage controllers operating in an active-passive mode and disk media shared by the first and second storage controllers. The operations may further comprise causing the first storage controller operating as a passive storage controller to enter, for each of a plurality of virtual disks on the disk media, a new Internet Small Computer Systems Interface (iSCSI) qualified name (IQN) for the virtual disk into a first iSCSI target configuration file and maintain an old IQN for the virtual disk in the first iSCSI target configuration file, wherein the first iSCSI target configuration file maps both the old and new IQNs to the virtual disks for the first storage controller. Still further, after an operation causing the first storage controller to begin operating as the active storage controller and the second storage controller to begin operating as the passive storage controller, the operations may further comprise causing the second storage controller operating as the passive storage controller to enter, for each of the plurality of virtual disks on the disk media, the new IQN for the virtual disk into a second iSCSI target configuration file and maintain the old IQN for the virtual disk in the second iSCSI target configuration file, wherein the second iSCSI target configuration file maps both the old and new IQNs to the virtual disks for the second storage controller.

In some embodiments, the processor that executes the program instructions may be included in a public cloud and may communicate with the compute nodes and the storage device via a gateway between an external network and an internal network that includes the compute nodes and the network storage device. Optionally, the compute nodes, the network storage device, and the internal network may operate as a private cloud. Specifically, a virtual machine in the public cloud may run a private cloud controller application that controls various operations of the private cloud, such as the operations of the first and second storage controllers in the network storage device and/or the operations of the compute nodes. In an alternative embodiment, the processor that executes the program instructions may be included in a management node on the internal network.

In some embodiments, the operations may further comprise providing a user interface for inputting the new IQN and the identity of the network storage device. The user interface may further provide for any input necessary to initiate the upgrade of the storage controllers and/or the compute nodes, such as identifying software files for an upgrade of the storage controllers and/or identifying software files for an upgrade of the compute node. While embodiments are primarily focused on providing a new IQN to the storage controllers and compute nodes, other software upgrades may be implemented via the disclosed operations.

Embodiments of the network storage device or node may have two storage controllers that operate in a "shared-everything model", meaning that the two storage controllers share access to the disk. Furthermore, the two storage controllers are configured in an active-passive mode such that a first storage controller may be currently designated as the active storage controller and a second storage controller may be currently designated as the passive storage controller. Whichever one of the two storage controllers is currently designated as the active storage controller has exclusive access to all the disks. However, at any point that the storage controller currently designated or operating as the active storage controller fails, the other storage controller that is designated or operating as the passive storage controller automatically takes over as the new active storage controller. There is little or no downtime for the users (virtual machines) of the virtual disks during this failover between the two storage controllers.

Embodiments may be used in various situations whether it is desirable to change the IQN names of iSCSI targets to reflect a change in the identity of the storage provider (naming authority) as reflected in the domain name of the storage provider. Specifically, the "naming authority" that is identified within the IQN name may be the domain name of the storage provider and this domain name may occasionally change. In one example, the naming authority could change as a result of an acquisition of the company that established the original naming authority, renaming the company that established the original naming authority, or changing the domain name to be used by the original naming authority. Unfortunately, changing the IQN names of iSCSI targets typically requires downtime of the storage device that hosts the iSCSI targets.

In one non-limiting example, Corporation XYZ may acquire a storage provider called Storage Corp. Accordingly, each of the storage IQN names may have identified the naming authority as "com.storagecorp" (the reverse of Storage Corp's domain name). However, after the acquisition, Corporation XYZ may want to "rebrand" all the storage disks to reflect their own identity in the naming authority. So, the IQN names may be changed from:
iqn.2015.com.storagecorp:180ddc3a-0bf4-4238-b6e5-6578ca268c14
to:
iqn.2020-02.com.xyz:180ddc3a-0bf4-4238-b6e5-6578ca268c14

It may also be necessary or desirable to change the IQN of certain iSCSI targets in the following situations or scenarios:
1. Organizational Rebranding Requirement on IQN names iqn.yyy-mm.naming-authority:unique for example: iqn.2012-01.ibm-systemx.us may change to iqn.2021-01.lenovo-thinksystem.us 2. Deployment—iSCSI driver provides default values for the iSCSI initiator and iSCSI target device parameters on respective devices like iqn.1994-05.com.redhat: 88e3e9ff5fcc (dynamically assigned by Red Hat) or iqn.1991-05.com.microsoft:pchostname.com (dynamically assigned by Microsoft linking to hostname)
3. Windows Hostname changes or when adding Windows machine to Domain Controller (AD)—dynamic iqn on windows is linked to hostname.
4. VmWare Interface Changes—IQN names are tagged to adapter interfaces (which are dynamic in nature too)—For example: for adapter interface vmhba67, the dynamic IQN is iqn.1998-01.com.vmware:xyz:vmware.com:452738760:67
5. Operating: Svsteni Upgrades—In some cases, the dynamic IQN is generated based on a universally unique identifier (UUID) at the operating system (OS) level, system level or product level. Optionally, a Cloud Controller or other Management entity within a computing system may apply software upgrades to one or both of a compute node forming an IQN initiator and a storage device containing an IQN target, such as an operating system upgrade or update applied to the compute node and a new storage software version applied to the storage controllers of the storage device. Such upgrades and IQN change require a reboot of each of the affected IQN nodes.

While the IQN for an IQN node may be changed manually by a storage administrator (personnel) one IQN node at a time, the IQN for an IQN node may alternatively be created dynamically using program code. An example of using program code to dynamically create an IQN for an IQN node includes creating the IQN for a virtual disk (block storage) to be associated with a virtual machine. Accordingly, when the virtual machine is provisioned, the IQN for the virtual disk (iSCSI target) may be dynamically created. Regardless of whether the IQN is created manually or dynamically, IQN name changes on the iSCSI initiator and the iSCSI target require a disconnect operation, an IQN update operation, and a reconnect operation.

In a computing system having storage devices that are iSCSI targets with high-availability dual storage controllers, embodiments provide a method to change one or more fields or strings of the IQN that are associated with the naming authority, including the "yyyy-mm" string that identifies the year and month when the naming authority was established and the ".naming.authority" string that is the reverse syntax of the domain name of the naming authority, in a seamless manner without downtime for consumers of the virtual disks, such as virtual machines and applications running on the compute node. In one option, the operations of changing the one or more fields or strings of the IQN may provide a standalone method where a mere change in the naming authority is being implemented. However, the operations of changing the one or more fields or strings of the IQN may also be just one part in a method of upgrading a computing system. For example, the upgrade may include software changes to various aspects of the operating systems or controller programs.

In some embodiments, for each of the plurality of virtual disks, the new IQN for the virtual disk may have a different naming authority than the old IQN for the virtual disk but may have the same universally unique identifier (UUID) as the old IQN. Optionally, for each of the plurality of virtual disks, the new IQN may be formed, or may be considered as if having been formed, by replacing the values in the naming authority field and the naming authority establishment date field in the old IQN with the values of a new naming authority and a naming authority establishment date for the new naming authority.

In some embodiments, various operations may be facilitated by causing a storage controller to run a script. For example, the first storage controller operating as the passive storage controller may be caused to enter, for each of the plurality of virtual disks on the disk media, the new IQN for the virtual disk into the first iSCSI target configuration file and maintain the old IQN for the virtual disk in the first iSCSI target configuration file by causing the first storage controller to run a script written for that purpose. Similarly at a different point in time, the second storage controller operating as the passive storage controller may be caused to enter, for each of the plurality of virtual disks on the disk media, the new IQN for the virtual disk into a second iSCSI target configuration file and maintain the old IQN for the virtual disk in the second iSCSI target configuration file by causing the second storage controller to run a script written for that purpose. After running these scripts, the iSCSI target configuration files will include two entries for each virtual disk so that the virtual disk can be accessed by a hypervisor using either the old IQN or the new IQN. However, it is possible to cause the storage controllers to subsequently run other scripts to remove the old IQN entries form the iSCSI target configuration files as part of causing the storage controllers to exit the compatibility mode.

In some embodiments, the operations may further comprise causing, for each of a plurality of compute nodes, an upgrade to a hypervisor running on the compute node, wherein the upgraded hypervisor uses the new IQNs to access virtual disks on the network storage device. Of course, the upgraded hypervisor may include additional new or revised software code that provides other functionality, but the emphasis here is the use of the new IQNs. In one option, the operations may facilitate the hypervisor upgrade on any one or more of the compute nodes, such as a first compute node, by causing virtual machines to be migrated from the first compute node to a second compute node prior to causing the upgrade to the hypervisor running on the first compute node, wherein the first and second compute nodes are included in the plurality of compute nodes. Accordingly, virtual machines are allowed to continue running during a hypervisor upgrade by migrating the virtual machines to another compute node prior to the hypervisor upgrade. Optionally, the virtual machines may be migrated back to the first compute node subsequent to the hypervisor upgrade.

It should be understood that, prior to a hypervisor upgrade, the hypervisors of the plurality of compute nodes are able to connect with the virtual disks on the disk media of the network storage device using the old IQN. After the hypervisor upgrade, the hypervisors of the plurality of compute nodes are able to connect with the virtual disks on the disk media of the network storage device using the new IQN. However, during a period of time that the hypervisors of some compute nodes have been upgraded and the hypervisors of other compute nodes have not been upgraded, the storage controllers in the compatibility mode are able to provide access to the virtual disks using both the new IQNs as used by the upgraded hypervisors and the old IQNs as used by the hypervisors that are not yet upgraded. Accordingly, the compatibility mode of the storage controllers can be considered to provide dual compatibility to both upgraded hypervisors and hypervisors that are not yet upgraded as the upgrade process advances across each of the compute nodes. In this manner, the first and second storage controllers and each of the compute nodes may be upgraded from the old IQNs to the new IQNs without causing a virtual machine running on the plurality of compute nodes to lose access to the virtual disk assigned to the virtual machine.

The hypervisor serves as an iSCSI initiator to identify an iSCSI target, establish an iSCSI session with the iSCSI target, and perform data storage operations on the iSCSI target. Optionally, an iSCSI initiator may use one of the following target discovery methods:

(1) Accessing an iSNS (Internet Storage Name Service)— An iSCSI initiator may receive a hostname, fully qualified domain name (FQDN) or Internet Protocol (IP) address for an iSNS server. An iSNS server may act as a mediator between iSCSI initiators and iSCSI targets to make it simple for the iSCSI initiators to discover the iSCSI targets. For example, the iSNS may periodically syncs with all the of the iSCSI targets and stores identification and other parameters regarding the iSCSI targets. Accordingly, the iSCSI initiators may query the iSNS to discover one or more iSCSI target.

(2) The sendtargets method—An iSCSI initiator may use the sendtargets method along with a hostname, fully qualified domain name (FQDN) or an IP address of a target node, such as a storage node. The sendtargets method then returns a list of all available iSCSI targets found at the identified address (i.e., hostname, FQDN or IP address) along with the IQNs for each iSCSI target to the iSCSI initiator that executed the sendtargets method. After receiving the target and portal information, the iSCSI initiator tries to establish an iSCSI session with each of the listed iSCSI targets through all of the identified portals.

(3) Static Discovery—A static discovery method may be used in situations where the iSCSI initiator has access restrictions. If the iSCSI initiator does not have access to all the target IQNs or if the iSCSI initiator should not establish sessions with all available targets, then it may be desirable to use the static discovery method or the iSNS discovery method.

After the hypervisor (iSCSI initiator) has identified an iSCSI target, there are two phases to establishing an iSCSI Session between the iSCSI initiator and the iSCSI target. The first phase is a "login phase", which includes establishment of a Transport Control Protocol (TCP) session, optional authentication, and an iSCSI Login Request and Response. The second phase is a "storage read/write phase", which includes SCSI Commands sent by the iSCSI initiator to the iSCSI target and SCSI Responses sent by the iSCSI target to the iSCSI initiator. Each virtual machine is unaware that the storage disk is an iSCSI disk exported over the network. Rather, the virtual machine views the storage disk as a 'locally attached disk' accessible using an SCSI connection. All of the iSCSI operations are performed by the compute hypervisor without the virtual machine being aware of these operations.

In some embodiments, the operations may further comprise determining that the hypervisor of each of the plurality of compute nodes has been upgraded and causing the old IQN for each virtual disk to be removed from the iSCSI target configuration files of the first storage controller and the second storage controller. For example, the operation of causing the old IQN for each virtual disk to be removed from the iSCSI target configuration files of the first storage controller and the second storage controller may be performed in response to determining that the hypervisor of each of the plurality of compute nodes has been upgraded. Optionally, the first and second storage controllers may be caused to run a script that removes the old IQN for each virtual disk from the iSCSI target configuration file, thereby leaving the iSCSI target configuration to include only the new IQN for each virtual disk.

In some embodiments, the operations may further comprise causing the first and second storage controllers to enter into a compatibility mode characterized by the ability to store both the old IQN and the new IQN for each virtual disk in the first and second iSCSI target configuration files. Still further, the operations may comprise causing, after upgrading hypervisors on a plurality of compute nodes to access the network storage device using the new IQNs, the first and second storage controller to exit from the compatibility mode so that the first and second iSCSI target configuration files only store the new IQN for each virtual disk. Accordingly, the hypervisor upgrades may all occur while the first and second storage controller are in the compatibility mode that enables the first and second storage controllers to associate both the new IQN and the old IQN with each virtual disk. Furthermore, the compatibility mode may also enable the first and second storage controllers to provision additional virtual disks for virtual machines supported by the upgraded hypervisors using the new IQNs and to provision additional virtual disks for virtual machines supported by hypervisors that are not yet upgraded using the old IQNs. Preferably, a virtual disk that is provisioned while the storage controllers are in the compatibility mode will represented in the iSCSI target configuration file with two entries, one entry using an IQN with the old naming authority and one entry using an IQN with the new naming authority. Accordingly, a newly provisioned virtual disk may be discovered by a virtual machine regardless of whether it is being run on, or migrated to, a hypervisor that has been upgraded or not yet upgraded.

In some embodiments, the compute nodes and the storage device are components of a composable private cloud that are connected by an internal network. For example, embodiments may be implemented in a computing system having separate compute nodes, network nodes and storage nodes, as is found in composable infrastructure. The compute nodes may be responsible for running virtual machines on a hypervisor. The network nodes may manage networking between compute nodes and storage nodes, as well as networking between the virtual machines. The storage nodes may carve out virtual disks from the storage capacity and export them as iSCSI disks for use by the compute nodes. The storage nodes are preferably high availability storage nodes having two storage controllers accessing the same storage disk. For example, the two storage controllers may include a first storage controller currently designated as an active storage controller and a second storage controller currently designated as a passive storage controller. If the active storage controller fails, the passive storage controller takes over as the active storage controller. The storage device (node) may include one or more hardware disks managed by a volume manager and may expose virtual disks to the compute nodes as iSCSI disks. Each iSCSI disk has a unique IQN. The storage node may also use a SCSI target software stack (SCST) module, including SCST target utilities for hosting iSCSI targets. The storage controllers may also store an iSCSI target configuration file that maps each IQN to a universally unique identifier (UUID) for a particular virtual disk.

Some embodiments provide a computer-implemented method comprising identifying a network storage device having first and second storage controllers operating in an active-passive mode and disk media shared by the first and second storage controllers. The computer-implemented method may further comprise causing the first storage controller operating as a passive storage controller to enter, for each of a plurality of virtual disks on the disk media, a new IQN for the virtual disk into a first iSCSI target configuration file and maintain an old IQN for the virtual disk in the first iSCSI target configuration file, wherein the first iSCSI target configuration file maps both the old and new IQNs to the virtual disks for the first storage controller. Still further, after the computer-implemented method causes the first storage controller to begin operating as the active storage controller and the second storage controller to begin operating as the passive storage controller, the computer-implemented method may further comprise causing the second storage controller operating as the passive storage controller to enter, for each of the plurality of virtual disks on the disk media, the new IQN for the virtual disk into a second iSCSI target configuration file and maintain the old IQN for the virtual disk in the second iSCSI target configuration file, wherein the second iSCSI target configuration file maps both the old and new IQNs to the virtual disks for the second storage controller.

The foregoing computer-implemented method may further include any one or more operations described herein in reference to program instructions of a computer program product. Accordingly, a separate description of the computer program product will not be duplicated in the context of a computer-implemented method. It should be understood that any of the operations, actions or tasks performed by the computer program product may be performed in accordance with the computer-implemented method. Embodiments may further include a system and/or an apparatus for implementing the operations of the computer program product or performing the computer-implemented method.

FIG. 1 is a diagram of a composable computing system 10 in communication with a cloud controller application 12, which may run in a virtual machine of a public cloud. The composable computing system 10 includes compute resources 20, storage resources 30 and network resources 40. The compute resources 20 may include a plurality of compute nodes 22, such as servers, each including a central processing unit (CPU) 24, memory 26, and a network adapter 28. The storage resources 30 may include various data storage devices, which may be configured to provide network data storage to the compute nodes 22. At least one data storage device 32 includes two storage controllers that operate in an active-passive mode, where one of the storage controllers operates as an active storage controller 34, another of the storage controller operates as a passive storage controller 36, and the storage media, such as disk drives 38, are shared by the two storage controllers 34, 36. The network resources 40 include any number of network switches 42 and a gateway 44 that supports communication between the components of the composable computing system 10 and an external network 14. For example, the network switches 42 and the gateway 44 enable the cloud controller application 12 to communicate with the storage controllers 34, 36, the compute nodes 22 and other components of the composable computing system 10.

Figure 2:
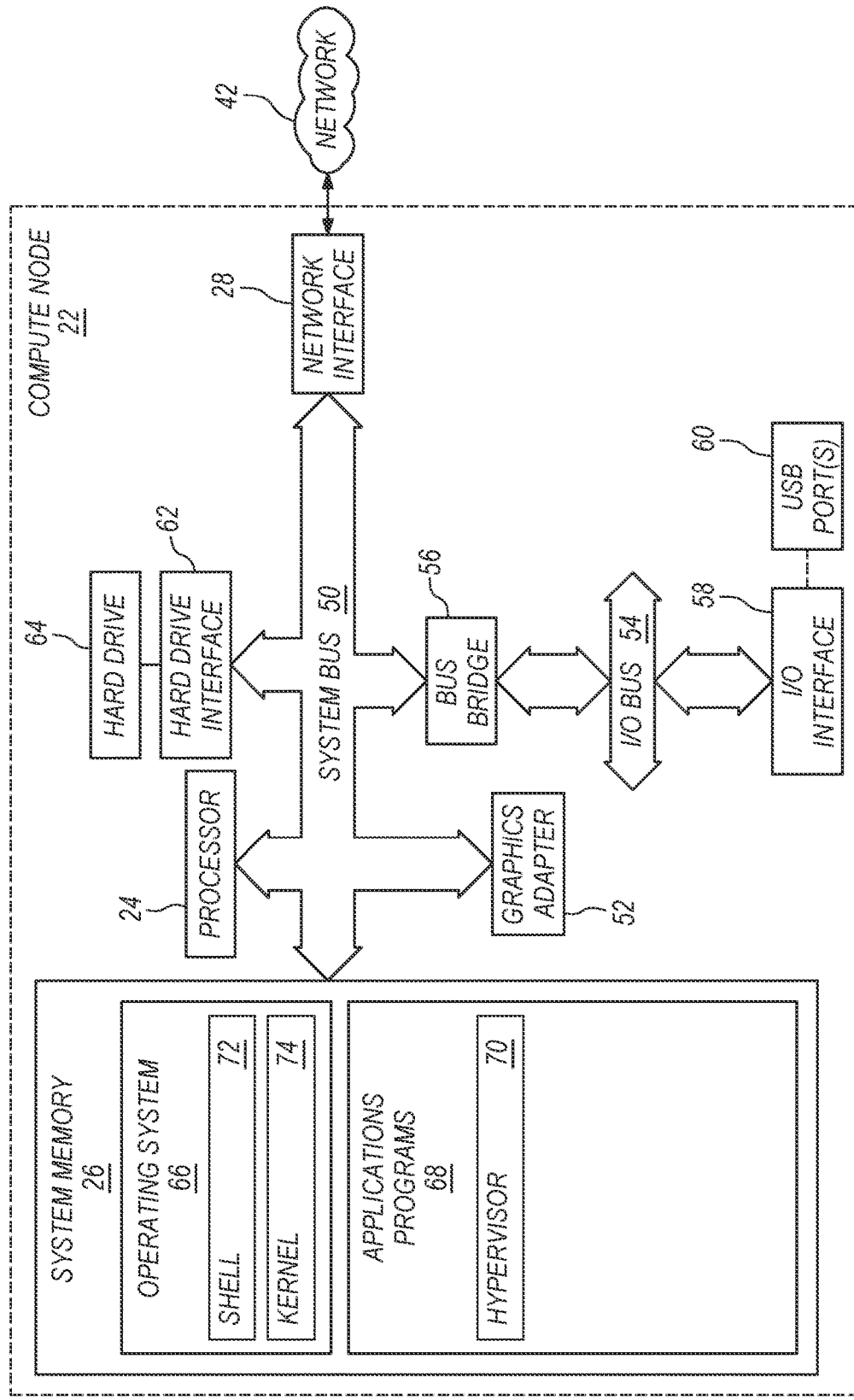
FIG. 2 is a diagram of a compute node.

FIG. 2 is a diagram of a compute node 22 as shown in the composable computing system 10 of FIG. 1. The compute node 22 includes a processor unit 24 that is coupled to a system bus 50. The processor unit 24 may utilize one or more processors, each of which has one or more processor cores. A graphics adapter 52 may also be coupled to system bus 50. The graphics adapter 52 may, for example, include a graphics processing unit (GPU). The system bus 50 is coupled to an input/output (I/O) bus 54 via a bus bridge 56. An I/O interface 58 is coupled to the I/O bus 54 and may support communication with various I/O devices (not shown) and one or more USB port(s) 60. As depicted, the compute node 22 is able to communicate with other network devices over the network 42 using a network adapter or network interface controller 28.

A hard drive interface 62 is also coupled to the system bus 50. The hard drive interface 62 interfaces with a hard drive 64. In a preferred embodiment, the hard drive 64 communicates with system memory 26, which is also coupled to the system bus 50. System memory is defined as a lowest level of volatile memory in the compute node 22. This volatile memory may include additional higher levels of volatile memory (not shown), including, but not limited to, cache memory, registers and buffers. Data that populates the system memory 26 may include an operating system (OS) 66 and application programs 68. Embodiments may include application programs 68 that include the program instructions for implementing a hypervisor 70 according to one or more embodiments.

The operating system 66 for the compute node 22 may include a shell 72 for providing transparent user access to resources such as the application programs 68. Generally, the shell 72 is a program that provides an interpreter and an interface between the user and the operating system. More specifically, the shell 72 executes commands that are entered into a command line user interface or from a file. Thus, the shell 72, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 74) for processing. Note that while the shell 72 may be a text-based, line-oriented user interface, embodiments may support other user interface modes, such as graphical, voice, gestural, etc.

As depicted, the operating system 66 also includes the kernel 74, which may include lower levels of functionality for the operating system 66, including providing essential services required by other parts of the operating system 66 and application programs 68. Such essential services may include memory management, process and task management, disk management, and mouse and keyboard management.

Figure 3:
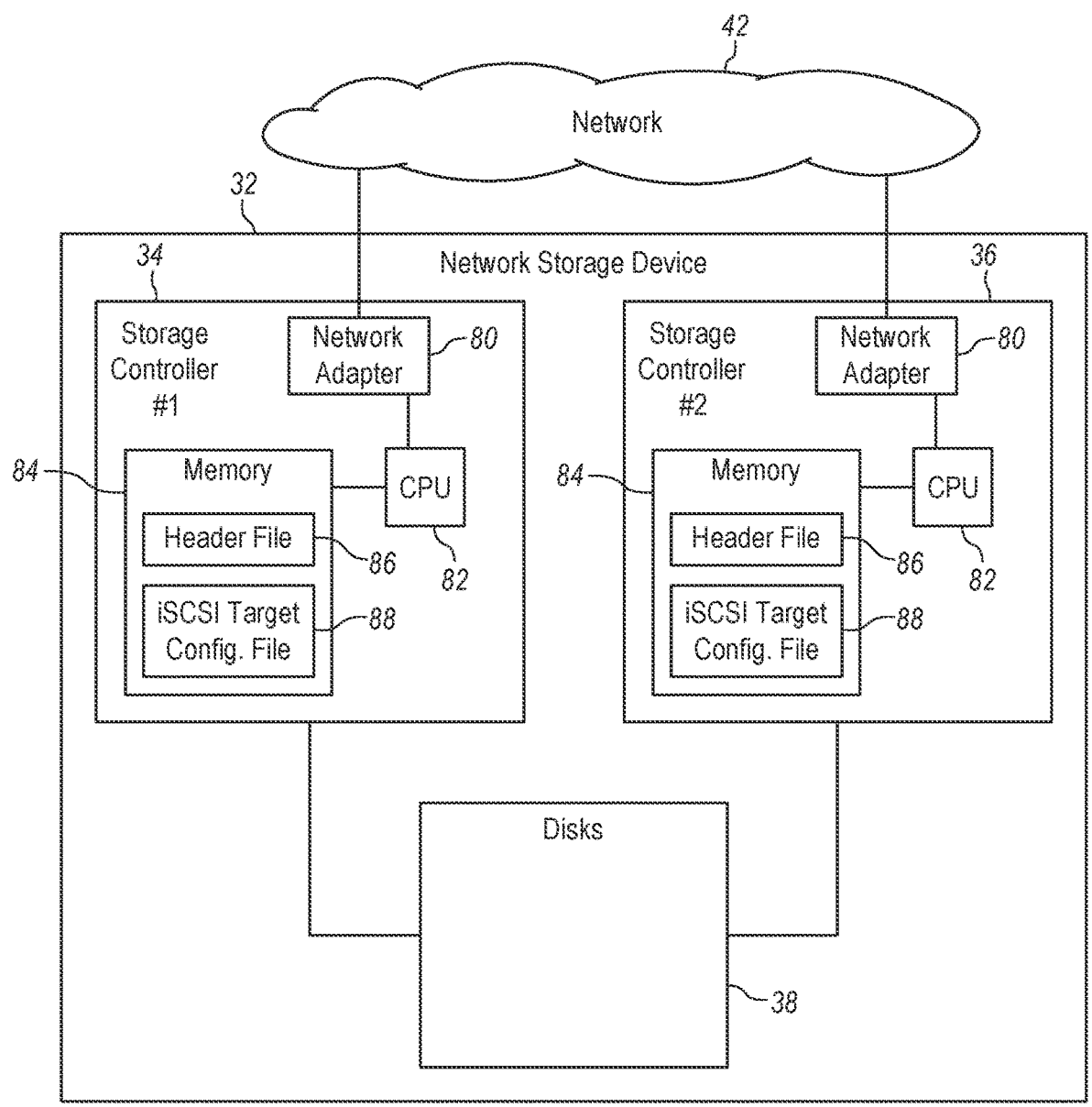
FIG. 3 is a diagram of a network storage device having two storage controllers sharing disk media.

FIG. 3 is a diagram of a network storage device 32 having two storage controllers 34, 36 sharing disk media 38. A first storage controller 34 ("Storage Controller #1") and a second storage controller 36 ("Storage Controller #2") may have similar architecture and are shown in FIG. 3 using the same reference numbers for similar components. Accordingly, each storage controller 34, 36 has a network adapter 80, a central processing unit (CPU) 82, and memory 84. The central processing unit (CPU) 82 may execute a storage controller program (not shown) stored in memory 84 to perform various operations of the storage controller, such as exposing iSCSI targets (virtual disks) and handling read/write commands relative to the disks 38. Furthermore, the storage controller program (not shown) may implement the active-passive mode for the two storage controllers 34, 36 such that one storage controller operates as an active storage controller while the other storage controller operates as a passive storage controller unless or until the active storage controller experiences a failure event (high availability event).

In order to support the operation of the storage controllers 34, 36, each storage controller includes a network adapter 80 that enables the CPU 82 to communicate with the internal network 42 of the computing system 10 (see FIG. 1). Specifically, all input from the network 42, such as communications from virtual machines and hypervisors running on the compute nodes 22 and/or communications from the cloud controller application 12 (see FIG. 1), must reach the storage controllers 34, 36 through the network adapter 80. However, only one of the two storage controllers 34, 36 will operate as the active storage controller at any point in time, and it is the active storage controller that will handle read/write commands to the disks 38.

The memory 84 is illustrated as storing a header file 86 and an iSCSI target configuration file 88 (for example, an SCST configuration file) that are used by the CPU 82 along with the storage controller program. The header file 86 may include a hard-coded value for the current IQN value, whether that is the old IQN prior to a storage controller upgrade or the new IQN subsequent to a storage controller upgrade. This IQN value in the header file may be used by the CPU 82 to create additional iSCSI targets using, for example, a target administrator lightweight command (cmdlet) such as scstadmin for SCST based targets. The iSCST target configuration file 88 maps each IQN to a virtual disk (UUID). Accordingly, the iSCSI target configuration file 88 may include an entry for the old IQNs prior to the storage controller entering the compatibility mode, may include entries for both the old IQNs and the new IQNs during the compatibility mode, and may include an entry for just the new IQNs after exiting the compatibility mode.

Figure 4:
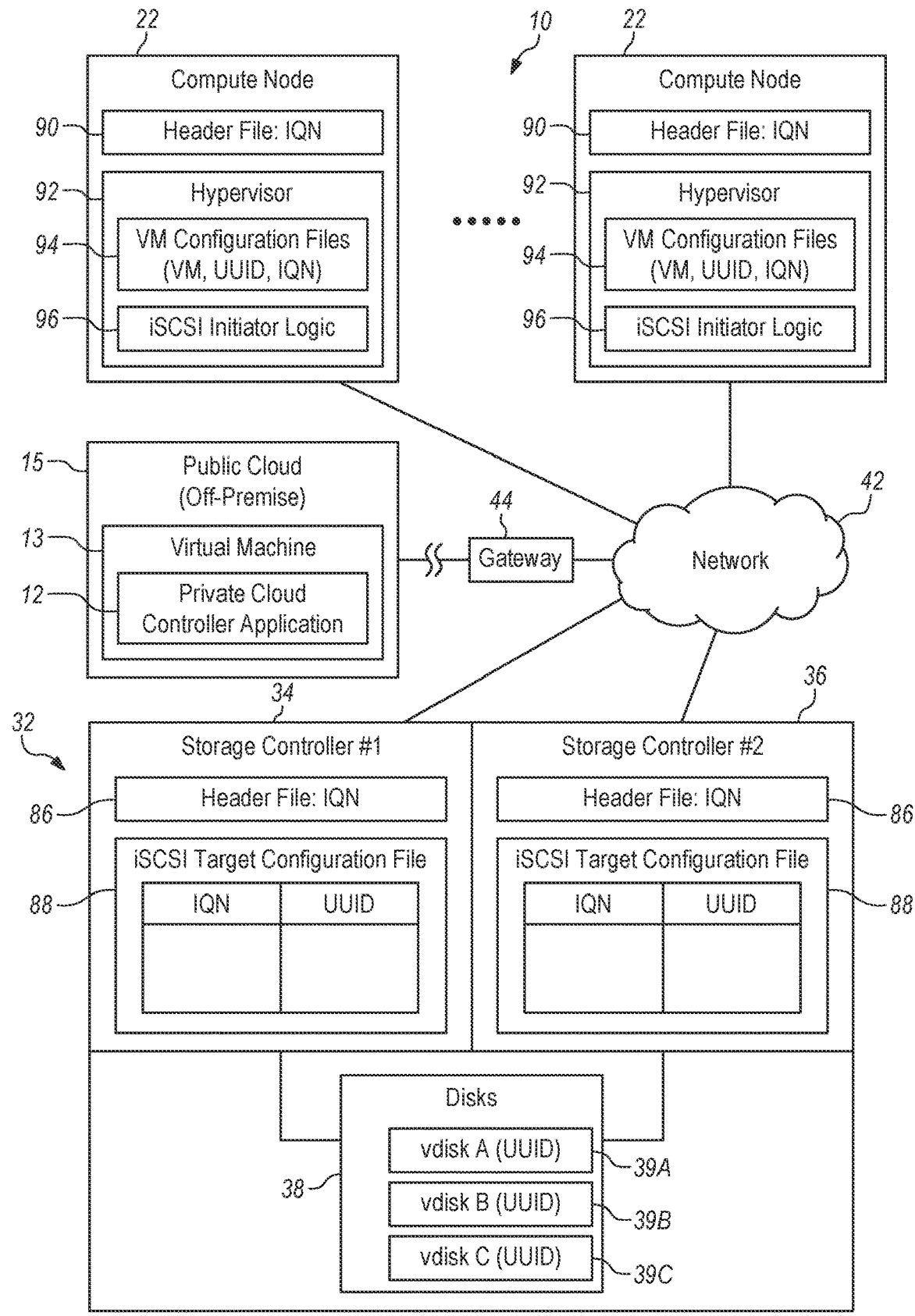
FIG. 4 is a diagram illustrating the cloud controller application in communication with various components of the composable computing system.

FIG. 4 is a diagram illustrating the private cloud controller application 12 in communication with various components of the composable computing system 10 via the gateway 44. In this illustration, the private cloud controller application 12 runs in a virtual machine 13 on the off-premises public cloud 15. The private cloud controller application 12 sends out commands to the storage controllers 34, 36 of the network storage device 32 and sends out commands to the compute nodes 22 to control the process of upgrading the storage controllers 34, 36 and the compute nodes 22 to use a new IQN, perhaps also including additional functionality in the software upgrade. It is the commands provided by the private cloud controller application 12 that cause the upgrade process to advance through the operations described in the various embodiments. Furthermore, the private cloud controller application 12 may further receive feedback or notifications from the storage controllers 34, 36 and the compute nodes 22 so that the private cloud controller application 12 may monitor progress and determine when one operation is completed and when to initiate the next operation.

Each of the storage controllers 34, 36 stores an iSCSI target configuration file 88 that maps each IQN (left-hand column) to a virtual disk (UUID in right-hand column). When the storage controllers are in the compatibility mode, the iSCSI target configuration files 88 may be updated so that each virtual disk (iSCSI target) entry in the iSCSI target configuration file will be duplicated to include both the old IQN and the new IQN for the virtual disk. When the storage controller exits from the compatibility mode, all the old IQNs are deleted from the iSCSI target configuration file, leaving each virtual disk entry with only the new IQN.

In addition to storing and updating the virtual disk IQNs in the iSCSI target configuration file 88, the new IQN value (iqn.2020.02.com.lenovo) is stored in a header file 86 common to both of the storage-controllers and the compute-controller code. The new IQN value may be hard coded in the header file 86 of the new version of software for both the storage and compute nodes. This IQN value is used to create additional iSCSI targets, such as the virtual disks 39A-C ("vdisks A-C") using the scstadmin command. For example, the value 'iqn.2020.02.com.lenovo' may be obtained from the IQN value hard coded in the header file 86. This value is substituted into the scstadmin command as illustrated here:

//scstadmin-noprompt-add_target iqn.2020-02.com.lenovo:
    aaaabbbb-3939-cccc-8787-ddddeeeeffff-driver iscsi
//aaaabbbb-3939-cccc-8787-ddddeeeeffff: This is the virtual
    disk's UUID.

Alternatively, the desired IQN name may be stored in a file and the program code may include code pointing to the file where the desired IQN name may be obtained, such that the desired IQN name is not hard coded in the header file. Some embodiments may replace the hard-coded IQN name in the header file with the code pointing to the file containing the desired IQN name.

During boot, the storage controller code creates these IQNs for existing virtual disks 39A-C and may subsequently use the new IQN value in the header file 86 to create new virtual disks as needed.

For the compute nodes 22, an IQN that may be hard coded in a header file 90, or stored in a separate file, is updated when the software code for the compute node is updated. Once a particular compute node 22 has been upgraded with the new software code, that compute node 22 interacts with the rest of the system using the new IQN value in the header file 90. So, when the storage controllers 34, 36 and the compute nodes 22 have been upgraded, they each use the new IQN value. However, when the active storage-controller has been upgraded and one or more of the compute nodes 22 has not yet been upgraded, then the storage controller "compatibility mode" is needed to facilitate the temporary presence of both the new IQNs and the old IQNs. Accordingly, the upgraded compute nodes can access the virtual disks using the new IQN values and the compute nodes that have not yet been upgraded can still access the virtual disks using the old IQN values.

Once the compute node software code has been upgraded, the compute-controller code is able to discover iSCSI devices using the new IQNs. Therefore, when a virtual machine is migrated to a compute node with the upgraded software code, the destination hypervisor 92 running on that compute node 22 may "re-create" the virtual machine configuration files 94 and, while doing so, attempts to discover the iSCSI disks for each disk UUID. Since the compute node has been upgraded with the new compute code, the compute node uses the new IQN value to discover the iSCSI disks. Specifically, the compute controller code performs the 'discovery and login' operation for the iSCSI disks using the iSCSI initiator logic 96 and an iSCSI initiator administrator tool, such as iscsiadm' command as illustrated here:

//iscsiadm-mode node-targetname iqn.2020-02.com.lenovo:
    aaaabbbb-3939-cccc-8787-ddddeeeeffff-login"

The value 'iqn.2020.02.com.lenovo' comes from this IQN value that may now be hard-coded in the header file 90 of the upgraded software code. This IQN value is substituted into the above command. The UUID of the virtual disk remains the same across the migrations and upgrade.

FIGS. 5A-5E are a sequence of conceptual diagrams of a pair of compute nodes 22 that may access a network storage device 32 have dual storage controllers operating in an active-passive mode. In this sequence of diagrams, the computing system has been simplified to focus on the sequence of operations in the overall process. Still, it should be recognized that the process described in reference to FIGS. 5A-5E is carried out in a computing system as shown in FIGS. 1-4. Furthermore, some embodiments may include fewer or additional operations than what is shown in FIGS. 5A-5E.

Figure 5A:
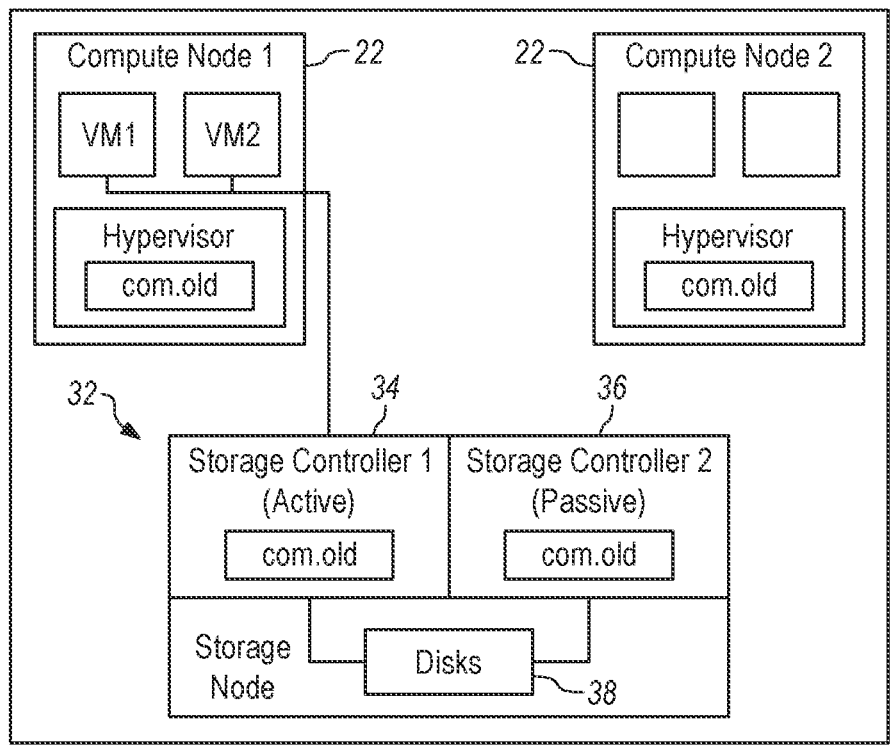
FIGS. 5A-5E are a sequence of diagrams of a pair of compute nodes that may access a data storage device have dual storage controllers operating in an active-passive mode.

FIG. 5A is a diagram of a simple computing system having a first compute node 22 ("Compute Node 1"), a second compute node 22 ("Compute Node 2"), and the network storage device 32. This diagram represents the computing system before initiating the upgrade process. As shown, the first compute node 22 has a hypervisor 70 supporting a first virtual machine XX (VM1) and a second virtual machines YY (VM2). The hypervisor 70 has not been upgraded and uses the old IQN ("com.old"). Similarly, the second compute node 22 has a hypervisor 70 that has not been upgraded and uses the old IQN ("com.old"), but no virtual machines are shown being supported by the hypervisor.

The first storage controller 34 ("Storage Controller 1") is currently operating as the active storage controller (see "Active") and the second storage controller 36 ("Storage Controller 2") is currently operating as the passive storage controller (see "Passive"). Neither of the storage controllers 34, 36 have been upgraded and use only the old IQN ("com.old") in the iSCSI target configuration file for mapping to virtual disks on the disk media 38 and in the header file for provisioning additional virtual disks. As illustrated by the lines connecting VM1 and VM2 to the active first storage controller 34, the virtual machines have formed an iSCSI connection to their virtual disks on the disk 38 via the hypervisor 70 and the first storage controller 34.

Figure 5B:
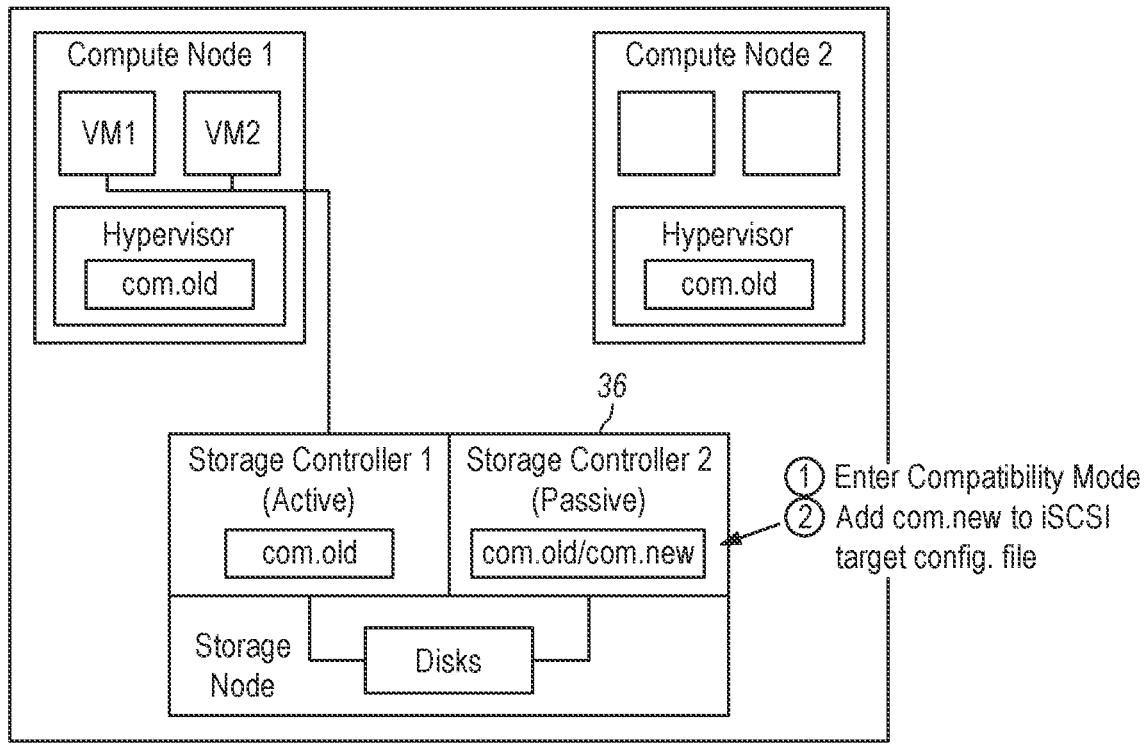

FIG. 5B is a diagram of the simple computing system of FIG. 5A with the second storage controller 36, which is operating as the passive storage controller ("Passive"), entering the compatibility mode to enable multiple IQNs per UUID. Furthermore, the second storage controller 36 is being upgraded, including creation of a new entry using the new IQN in the iSCSI target configuration file for each UUID. Specifically, the storage controller 36 now has two IQNs: "com.old" and "com.new" and two corresponding entries for every UUID in the iSCSI target configuration file.

Figure 5C:
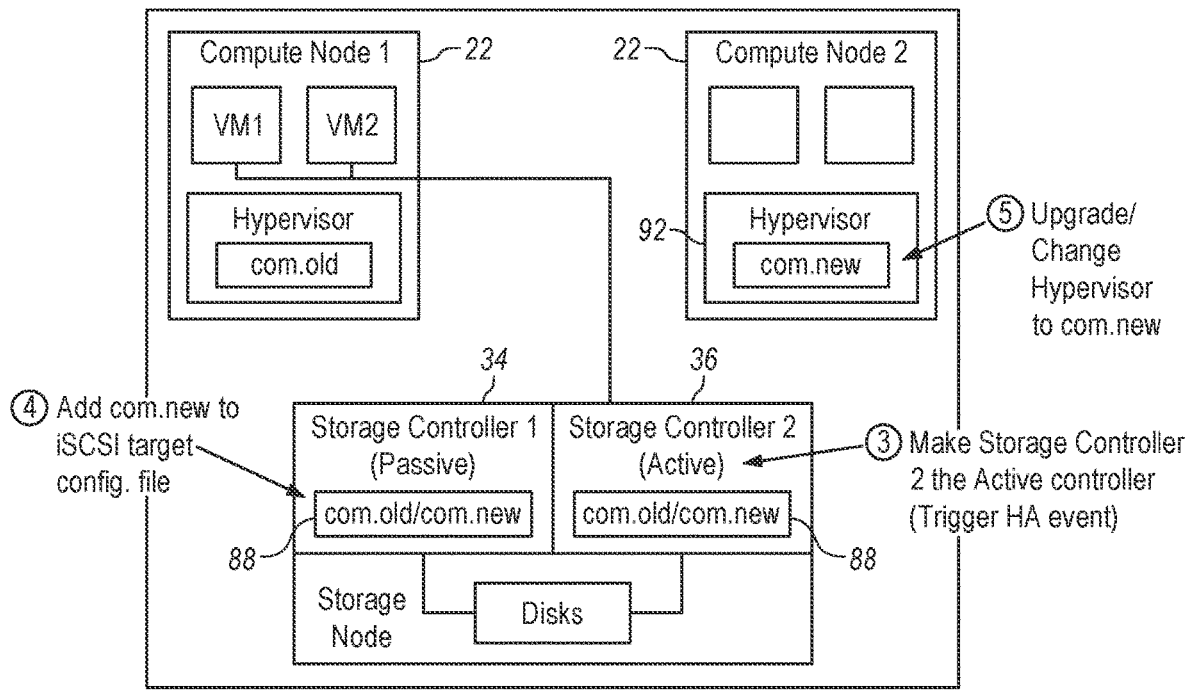

FIG. 5C is a diagram of the simple computing system of FIG. 5B with the second storage controller 36 now operating as the active storage controller ("Active") and the first storage controller 34 now operating as the passive storage controller ("Passive"). This failover may occur in response to triggering a high availability (HA) event. With the second storage controller 36 now operating as the active storage controller, the virtual machines VM1 and VM2 are disconnected from the first storage controller 34 and form a new connection with the second storage controller 36. This new connection is illustrated by the lines extending from VM1 and VM2 to the second storage controller 36. Notice that the hypervisor on the first compute node 22 has not been upgraded and is still using the old IQN to form connections with the second storage controller 36.

The first storage controller 34 may now be placed in the compatibility mode and upgraded similar to the second storage controller 36. As illustrated, the iSCSI target configuration file of both storage controllers 34, 36 now have two IQN entries ("com.old" and "com.new") for each UUID.

The hypervisor 92 of the second compute node 22 is also shown being upgraded to include the new IQN ("com.new") as previously described. It should be recognized that the upgrade to the second compute node 22 could have occurred earlier or later in the process, so long as the compute node 22 is currently not supporting virtual machines. A compute node should not be upgraded to use the new IQN in support of virtual machines until after the storage controllers have entered the compatibility mode and have been upgraded to recognize the new IQN.

Figure 5D:
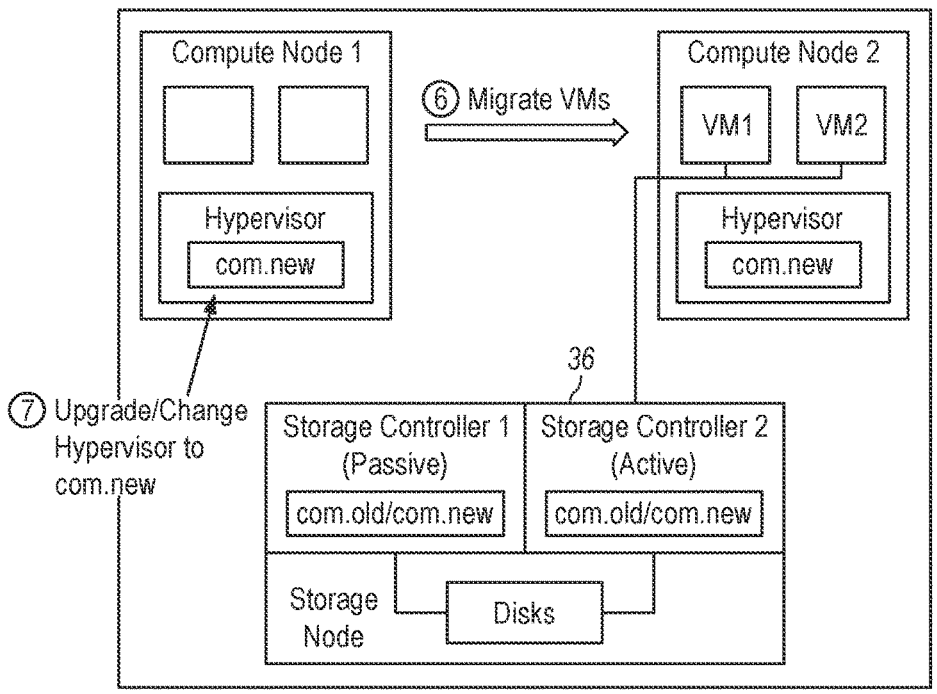

FIG. 5D is a diagram of the simple computing system of FIG. 5C with the virtual machines VM1 and VM2 having been migrated (see arrow) from the first compute node 22 to the second compute node 22. The upgraded hypervisor on the second compute node 22 has established a new connection with the second storage controller 36 using the new IQN ("com.new") for each of the virtual machines. Importantly, the upgraded second storage controller 36 was able to support a connection with the first storage controller 34 using the old IQN prior to migration and is also able to support a connection with the second storage controller 36 using the new IQN subsequent to migration. Next, the first compute node 22 is upgraded to use the new IQN.

Figure 5E:
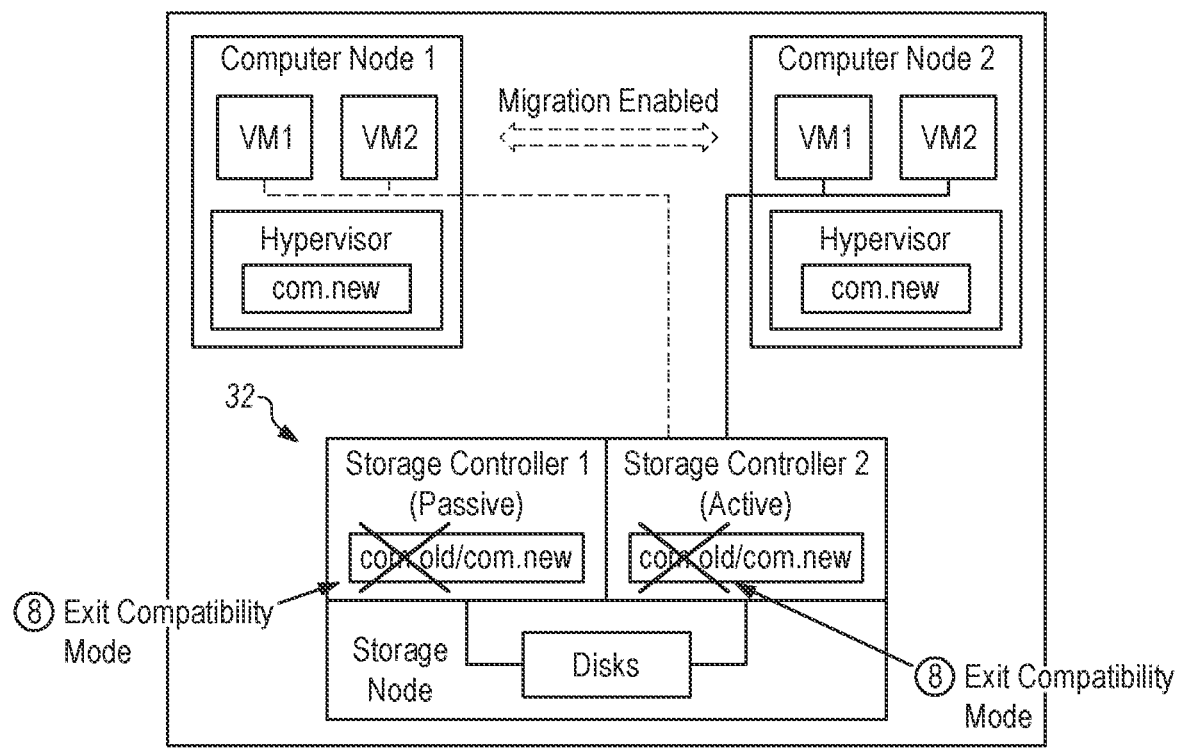

FIG. 5E is a diagram of the simple computing system of FIG. 5D illustrating that the virtual machines VM1 and VM2 may either remain on the second compute node or may be migrated back to the first compute node. Since both the first and second compute nodes 22 have been upgrade, the placement of the virtual machines may be determined independent of the present process. However, the virtual machines VM1 and VM2, along with any other or new virtual machines, are able to form connections with the virtual disks on the network storage device 32 using the new IQN regardless of which of the storage controllers 34, 36 is currently the active storage controller.

It should be recognized that a typical computing system will include additional compute nodes and that each of those compute nodes will need to be upgraded before exiting the compatibility mode. Finally, the storage controllers 34, 36 are caused to exit the compatibility mode after each of the compute nodes and the storage controllers have been upgraded to use the new IQN. Accordingly, each node uses only the new IQN and the iSCSI target configuration files maintained by the storage controllers may be purged of the virtual disk entries that use the old IQN such that only the entries using the new IQN remain.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-transitory computer readable medium and program instructions embodied therein, the program instructions being configured to be executable by a processor to cause the processor to perform operations comprising:

identifying a network storage device having first and second storage controllers operating in an active-passive mode and disk media shared by the first and second storage controllers;

causing the first storage controller operating as a passive storage controller to enter, for each of a plurality of virtual disks on the disk media, a new iSCSI qualified name (IQN) for the virtual disk into a first iSCSI target configuration file and maintain an old IQN for the virtual disk in the first iSCSI target configuration file, wherein the first iSCSI target configuration file maps both the old and new IQNs to the virtual disks for the first storage controller;

causing the first storage controller to begin operating as the active storage controller and the second storage controller to begin operating as the passive storage controller; and causing the second storage controller operating as the passive storage controller to enter, for each of the plurality of virtual disks on the disk media, the new IQN for the virtual disk into a second iSCSI target configuration file and maintain the old IQN for the virtual disk in the second iSCSI target configuration file, wherein the second iSCSI target configuration file maps both the old and new IQNs to the virtual disks for the second storage controller.

2. The computer program product of claim 1, wherein, for each of the plurality of virtual disks, the new IQN for the virtual disk has a new naming authority than the old IQN for the virtual disk but has the same universally unique identifier as the old IQN.

3. The computer program product of claim 2, the operations further comprising:
providing a user interface for inputting the new naming authority and the identity of the network storage device.

4. The computer program product of claim 1, wherein, for each of the plurality of virtual disks, the new IQN is formed by replacing the values in the naming authority field and the naming authority establishment date field in the old IQN with the values of a naming authority and a naming authority establishment date for a new naming authority.

5. The computer program product of claim 1, wherein the first storage controller operating as the passive storage controller is caused to enter, for each of the plurality of virtual disks on the disk media, the new IQN for the virtual disk into the first iSCSI target configuration file and maintain the old IQN for the virtual disk in the first iSCSI target configuration file by causing the first storage controller to run a script; and
wherein the second storage controller operating as the passive storage controller is caused to enter, for each of the plurality of virtual disks on the disk media, the new IQN for the virtual disk into the second iSCSI target configuration file and maintain the old IQN for the virtual disk in the second iSCSI target configuration file by causing the second storage controller to run a script.

6. The computer program product of claim 1, the operations further comprising:
causing, for each of a plurality of compute nodes, an upgrade to a hypervisor running on the compute node, wherein the upgraded hypervisor uses the new IQNs to access virtual disks on the network storage device.

7. The computer program product of claim 6, the operations further comprising:
causing virtual machines to be migrated from a first compute node to a second compute node prior to causing the upgrade to the hypervisor running on the first compute node, wherein the first and second compute nodes are included in the plurality of compute nodes.

8. The computer program product of claim 6, wherein the hypervisors of the plurality of compute nodes are able to connect with the virtual disks on the disk media of the network storage device using the old IQN prior to the hypervisor upgrade, and wherein the hypervisors of the plurality of compute nodes are able to connect with the virtual disks on the disk media of the network storage device using the new IQN after the hypervisor upgrade.

9. The computer program product of claim 8, wherein the first and second storage controllers and the compute nodes are upgraded from the old IQNs to the new IQNs without causing a virtual machine running on the plurality of compute nodes to lose access to the virtual disk assigned to the virtual machine.

10. The computer program product of claim 6, the operations further comprising:
determining that the hypervisor of each of the plurality of compute nodes has been upgraded; and
causing the old IQN for each virtual disk to be removed from the iSCSI target configuration files of the first storage controller and the second storage controller.

11. The computer program product of claim 1, the operations further comprising:
causing the first and second storage controllers to enter into a compatibility mode characterized by the ability to store both the old IQN and the new IQN for each virtual disk in the first and second iSCSI target configuration files; and
causing, after upgrading hypervisors on a plurality of compute nodes to access the network storage device using the new IQNs, the first and second storage controller to exit from the compatibility mode so that the first and second iSCSI target configuration files only store the new IQN for each virtual disk.

12. The computer program product of claim 11, wherein the compatibility mode enables the first and second storage controllers to provision new virtual disks using both the old IQNs and the new IQNs.

13. The computer program product of claim 1, where the compute nodes and the storage device are components of a composable private cloud that are connected by an internal network.

14. The computer program product of claim 13, wherein the processor is included in a public cloud and communicates with the compute nodes and the storage device via a gateway between an external network and the internal network.

15. The computer program product of claim 13, wherein the processor is included in a management node on the internal network.

16. A computer-implemented method comprising:
identifying a network storage device having first and second storage controllers operating in an active-passive mode and disk media shared by the first and second storage controllers;
causing the first storage controller operating as a passive storage controller to enter, for each of a plurality of virtual disks on the disk media, a new IQN for the virtual disk into a first iSCSI target configuration file and maintain an old IQN for the virtual disk in the first iSCSI target configuration file, wherein the first iSCSI target configuration file maps both the old and new IQNs to the virtual disks for the first storage controller;
causing the first storage controller to begin operating as the active storage controller and the second storage controller to begin operating as the passive storage controller; and
causing the second storage controller operating as the passive storage controller to enter, for each of the plurality of virtual disks on the disk media, the new IQN for the virtual disk into a second iSCSI target configuration file and maintain the old IQN for the virtual disk in the second iSCSI target configuration file, wherein the second iSCSI target configuration file maps both the old and new IQNs to the virtual disks for the second storage controller.

17. The computer-implemented method of claim 16, wherein, for each of the plurality of virtual disks, the new IQN is formed by replacing the values in the naming authority field and the naming authority establishment date field in the old IQN with the values of a naming authority and a naming authority establishment date for a new naming authority, and wherein, for each of the plurality of virtual disks, the new IQN has the same universally unique identifier as the old IQN.

18. The computer-implemented method of claim 16, wherein the first storage controller operating as the passive storage controller is caused to enter, for each of the plurality of virtual disks on the disk media, the new IQN for the virtual disk into the first iSCSI target configuration file and maintain the old IQN for the virtual disk in the first iSCSI target configuration file by causing the first storage controller to run a script; and wherein the second storage controller operating as the passive storage controller is caused to enter, for each of the plurality of virtual disks on the disk media, the new IQN for the virtual disk into a second iSCSI target configuration file and maintain the old IQN for the virtual disk in the second iSCSI target configuration file by causing the second storage controller to run a script.

19. The computer-implemented method of claim 16, further comprising:

causing, for each of a plurality of compute nodes, an upgrade to a hypervisor running on the compute node, wherein the upgraded hypervisor uses the new IQNs to access virtual disks on the network storage device, wherein the hypervisors of the plurality of compute nodes are able to connect with the virtual disks on the disk media of the network storage device using the old IQN prior to the hypervisor upgrade, and wherein the hypervisors of the plurality of compute nodes are able to connect with the virtual disks on the disk media of the network storage device using the new IQN after the hypervisor upgrade.

20. The computer-implemented method of claim 19, further comprising:

determining that the hypervisor of each of the plurality of compute nodes has been upgraded; and causing the old IQN for each virtual disk to be removed from the iSCSI target configuration files of the first storage controller and the second storage controller.

\* \* \* \* \*